R. C. DUNDAS.
METHOD AND APPARATUS FOR TREATING PETROLEUM.
APPLICATION FILED AUG. 11, 1917.
1,257,199.
Patented Feb. 19, 1918.
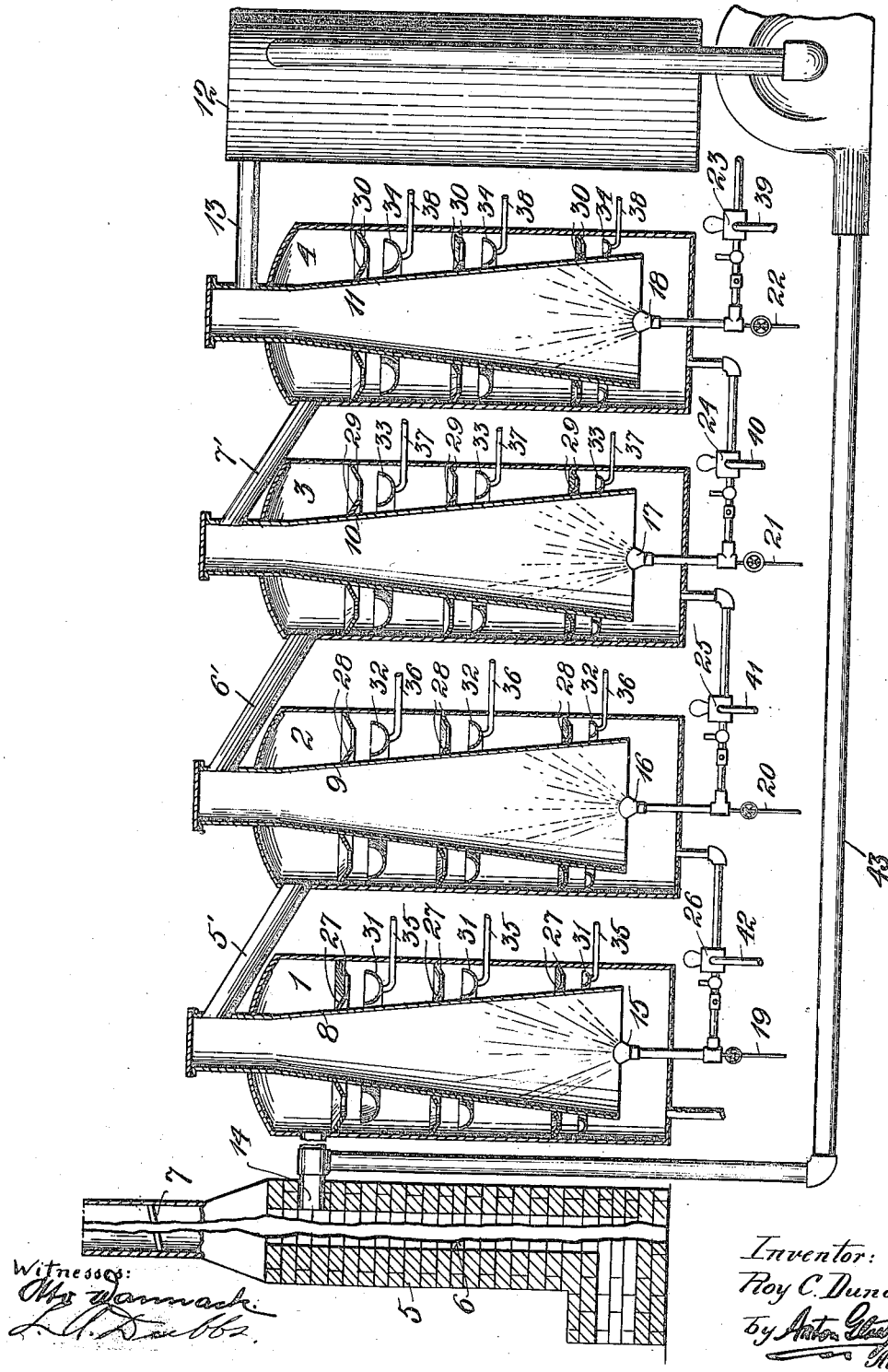
Inventor:
Roy C. Dundas,
by Anton Glaszos
Atty

UNITED STATES PATENT OFFICE.

ROY C. DUNDAS, OF LOS ANGELES, CALIFORNIA.

METHOD AND APPARATUS FOR TREATING PETROLEUM.

1,257,199.

Specification of Letters Patent. Patented Feb. 19, 1918.

Application filed August 11, 1917. Serial No. 185,732.

*To all whom it may concern:*

Be it known that I, ROY C. DUNDAS, a citizen of the United States, residing at Los Angeles and State of California, have invented a certain new and useful Method and Apparatus for Treating Petroleum, of which the following is a specification.

My invention relates to a method and apparatus for treating petroleum with the especial end in view of obtaining all component fractions in a condition undisturbed in the natural molecular arrangement and composition and a separation of the mother products into yields of any desired gravity.

The prime object of this invention is to provide a simple process and apparatus for effecting distillation or cracking of hydrocarbon oils.

Another object of this invention is to provide a means wherein during the treatment for conversion of the oil into vapor, condensation may be effected to the end that any and all gravities of condensates may be trapped and led off as they are developed, and separately collected. Any treatment of oil, be it distillation, cracking or re-cracking or viscosity reduction may be effectively practised by this invention, either separately or conjointly, it being a further object of this invention to carry out whatever process is required for treatment of a specific oil or the derivatives thereof.

My invention further contemplates economy in the use of heat whereby a greater or lesser degree may be used in effecting the necessary changes, and also in an efficient apparatus wherein the above stated objects may be expeditiously carried out.

The drawing represents a sectional elevation of an apparatus that may be used for treating oil according to my invention.

It comprises a battery of closed chambers 1, 2, 3 and 4, supplied with heat from a furnace 5, having a flue 6, and a damper 7. In each chamber, is suspended a vaporizing flue, 8, 9, 10 and 11, free of the walls of the chambers and preferably tapering in form. These vaporizing flues, as seen, extend above the top of the chambers and are connected with adjoining chambers by declined pipes 5', 6', and 7', respectively, the vaporizing flue 11, being connected with a collecting receptacle 12, by a pipe 13.

Heat is supplied from the furnace, combustion gases being conducted through a pipe 14 to the upper part of the chamber 1, first heating the contracted portion of the vaporizing flue 8, on the outside, then descending and entering into the vaporizing flue at the bottom thereof and then passing upwardly in said flue 8 and through pipe 5' to the adjoining chamber 2, wherein and also in the other associated chambers 3 and 4, the same circuit is successively performed.

Oil is admitted at the bottom of each vaporizing flue 8, 9, 10 and 11, preferably through a spraying device 15, 16, 17 and 18, which breaks up the oil into fine particles and delivers it against the heated walls thereof, simultaneously being acted upon by the gases traveling upwardly in said flues. Such breaking up or atomization of the oil may be furthered by saturated or superheated steam jetted through pipe 19, 20, 21 and 22, or these fluids may be used independently of the devices for atomization and concurrently for furnishing added heat in treating the oil.

The oil is delivered through the medium of a pump 23 to the lowest heat zone, that is, to the chamber 4. The residual products or those gravitating to the bottom are delivered successively to the chambers 3, 2 and 1, through pumps 24, 25, and 26. The heated gases, as stated, enter the chamber 1, in the top thereof, pass downwardly, and enter the vaporizing flue 8 at the bottom with the oil that is sprayed thereinto through the device 15. They then pass from the chamber, acting on and carrying with them the liberated products of the oil. Obviously the first chamber 1, receives the greatest heat, while the associated chambers are heated in progressively decreasing degree. Hence the lowest heat is first employed in acting on the petroleum, and the resulting products therefrom are led off through pipe 13 to the receptacle 12, as are all of the products that do not previously condense.

Since in each chamber a vaporization is effected, and since the heat in each decreases, it is apparent that those products which cannot be maintained in a vaporous state by the decreasing temperature in the progressive chambers, are condensed and hence each chamber, in addition to being a vaporizing chamber, is a condensing chamber.

To collect the condensates as they are formed, each chamber 1, 2, 3 and 4, is provided with a series of superposed inclined shelves 27, 28, 29 and 30, beneath each of which is disposed a trap 31, 32, 33 and 34, respectively, each provided with a drain pipe 35, 36, 37 and 38, respectively.

It will be noted that the gradual travel of the oil particles into the greater heat zone, which is the upper contracted end of each vaporizing flue, produces an even and continuous liberation of the vapors from the oil, at no time forcing the separation of the oil into its constituent products by excessive heat. By reason of such contraction of the vaporizing flues, a concentration of the heat is made possible for the purpose of maintaining the yielded products in a vaporous state and further acting upon them and any globules that may be entrained with them.

Each condensate drained from the various traps, may of course, be subjected to further treatments of distillation, cracking, or re-cracking by running same through the chambers or any desired number of them, or singly as necessary for specific products.

Such condensates may be drawn from their receptacles through pipes 39, 40, 41 and 42, respectively, on the pumps 23, 24, 25 and 26, which then force the same into the respective vaporizing flues.

The heat of the gases from the furnace may be modified or the gases may be chemically changed by introduction through a pipe 43, of any suitable agent, as used combustion gases or any other fluid.

What I claim, is:—

1. The method of treating petroleum which consists in spraying the oil into a vaporizing chamber and at the bottom thereof, supplying heated gases to the upper outer part of the vaporizing chamber and causing them to enter into the vaporizing chamber at the bottom thereof with the sprayed oil and pass upwardly inside said vaporizing chamber, and collecting the resultant products.

2. The method of treating petroleum which consists in spraying the oil into a series of vaporizing chambers and at the bottom thereof, supplying heated gases to the upper outside parts of said vaporizing chambers and causing them to enter said vaporizing chambers at the bottom thereof, conducting the heated gases and the vapors successively from one chamber to another whereby the oil is subjected to a different degree of heat in each chamber, continuously condensing the products in their travel from one chamber to another, and drawing off the condensed products.

3. The method of treating petroleum which consists in spraying the oil into a series of vaporizing flues and at the bottom thereof, applying heated gases to the upper outside parts of said chambers and causing them to enter into said vaporizing chambers at the bottom thereof and pass upwardly with the vapors, conveying the heated gases successively from one chamber to another whereby each chamber is subjected to a different degree of heat and portions of the liberated products are condensed, drawing off the condensed products, and subjecting same to further treatment in the chambers.

4. An apparatus for treating petroleum comprising a series of chambers, a vaporizing flue suspended in each said chamber and free of the walls thereof, means connecting the first chamber with a source of heated gases, to conduct them to and around the upper parts of said vaporizing flues, means connecting each vaporizing flue with an adjoining chamber to convey the heated gases and produced vapors from one chamber to another, means in each chamber to collect condensing products, and means to drain off the condensed products.

5. An apparatus for treating petroleum comprising a series of chambers each having suspended therein a tapering flue and each flue connected with an adjoining chamber by a downwardly extending pipe, means to spray the oil into the flues and at the bottom thereof, a source of heated gases, means to conduct the heated gases to the upper part of said chamber and against and around the contracted parts of said flues and cause them to enter the flues with the oil, traps in said chambers to collect the products condensing during the travel thereof from one chamber to another, means to drain the condensed products, and means to conduct the condensed products back to any one or more of the chambers for further treatment.

6. An apparatus for treating petroleum comprising a series of chambers, means to supply heated gases to the upper part of said chambers, a vaporizing flue suspended in and free of the walls of each of said chambers whereby to cause the heated gases from the supply first to heat the upper part of said flues and then travel downwardly on the outside and upwardly on the inside of said flues, means to supply oil in atomized form to said flues, means connecting each flue with an adjoining chamber, means for collecting the products condensing during the travel thereof from one chamber to another, a condenser connected with the last vaporizing flue, and means to convey the heated gases from such condenser to the heated gas supply means to modify the original heated gases.

7. An apparatus for treating petroleum comprising a series of chambers each having suspended therein and free of the walls thereof a vaporizing flue, a pipe connecting each vaporizing flue with an adjoining chamber, means to supply heated gases to the first chamber and cause them to pass through said connecting pipes from one chamber to another whereby each vaporizing flue is progressively subjected to a different degree of heat, means in each chamber to collect the condensing products, a drain for said means, a condenser connected with the last vaporizing flue, and means connecting the condenser with the heated gas pipe to modify the heated gases.

In testimony whereof I affix my signature in the presence of two witnesses.

ROY C. DUNDAS.

Witnesses:
M. NICOL,
ANTON GLOETZNER, Jr.